US007011274B1

(12) United States Patent
Hardoin

(10) Patent No.: US 7,011,274 B1
(45) Date of Patent: Mar. 14, 2006

(54) AIRCRAFT

(75) Inventor: Pierre Hardoin, La Ville aux Dames (FR)

(73) Assignee: Pierre Eugene Georges Hardoin, La Ville aux Dames (FR)

( * ) Notice: Subject to any disclaimer, the term of this patent is extended or adjusted under 35 U.S.C. 154(b) by 0 days.

(21) Appl. No.: 09/647,626

(22) PCT Filed: Oct. 6, 1997

(86) PCT No.: PCT/FR97/01765

§ 371 (c)(1),
(2), (4) Date: Aug. 2, 2002

(87) PCT Pub. No.: WO99/16667

PCT Pub. Date: Apr. 8, 1999

(30) Foreign Application Priority Data

Oct. 1, 1997 (FR) .................................... 97 12190

(51) Int. Cl.
*B64C 27/08* (2006.01)

(52) U.S. Cl. ................. 244/17.23; 244/12.4; 244/53 R

(58) Field of Classification Search ............ 244/17.23, 244/12.4, 53 R, 52

See application file for complete search history.

(56) References Cited

U.S. PATENT DOCUMENTS 3,211,399 A * 10/1965 Eickmann ................ 244/17.23

(Continued)

FOREIGN PATENT DOCUMENTS

| EP | 0 418 218 B1 | 5/1992 | |
|----|----|----|----|
| GB | 1116949 | * 6/1968 | .............. 244/17.23 |
| WO | WO 89/07547 | 8/1989 | |

OTHER PUBLICATIONS

Motors: http://www.tpub.com/content/engine/14105/css/14105_160.htm.*

(Continued)

*Primary Examiner*—Michael J. Carone
*Assistant Examiner*—Gabriel S. Sukman

(57) ABSTRACT

The invention concerns a land and flying vehicle with its tubular frame, 2 main rotors with blades and adjustable pitch-propellers, with its drive propelled by the force of a hydraulic turbine located at the end of its driving shaft. Said force is propelled by a very high pressure pump driven by an internal combustion engine or jet engine. Streamlined pusher propellers (already patented) located on the side are driven by hydraulic turbines located at the shaft end of rotating propellers from 0° to 180°, once they are extended.

Drawings describe the revolutionary design and unable the installation of said system on some current helicopter. By said method the present drive assembly, gimbal joints, gear boxes, are replaced with turbine drives with smooth and lightweight start. Said method can be adapted on running vehicles, including trains, whereof the designs and applications are reserved.

10 Claims, 5 Drawing Sheets

U.S. PATENT DOCUMENTS

| | | | |
|---|---|---|---|
| 3,614,029 A | * | 10/1971 | Eickmann ................ 244/17.23 |
| 3,801,046 A | * | 4/1974 | Eickmann ................ 244/17.23 |
| 3,977,302 A | * | 8/1976 | Eickmann .................... 91/492 |
| 3,983,833 A | * | 10/1976 | Eickmann ...................... 440/5 |
| 4,173,321 A | * | 11/1979 | Eickmann ................ 244/17.23 |
| 4,703,906 A | * | 11/1987 | Eickmann ................ 244/17.23 |
| 4,856,732 A | * | 8/1989 | Eickmann ...................... 244/2 |
| 2002/0100835 A1 | * | 8/2002 | Kusic ...................... 244/17.23 |

OTHER PUBLICATIONS

GE Turbine technology Goes to War, Seven decades of progress-A heritage of aircraft turbine technology, 1979, Aero Publishers Inc., 329 West Aviation Road, Fallbrook, CA 92028, pp. 10 & 39 document beginning "Centrifical flow compressors . . . ".

Le LAMA: La passion de la conquéte—D'Aérospatiale à EADS, 1970-2000, Claude Carlier and Gaetan Sciacco, Editions du Chene, 2001, p. 200.

Les Hélicoptéres: Magazine Aviation International, L'Aéronautique et son Architecture, N° 681, May 1-30, 1976, pp. 129 & 137.

"80 ans de selection," Aviation Revue May 1976.

* cited by examiner

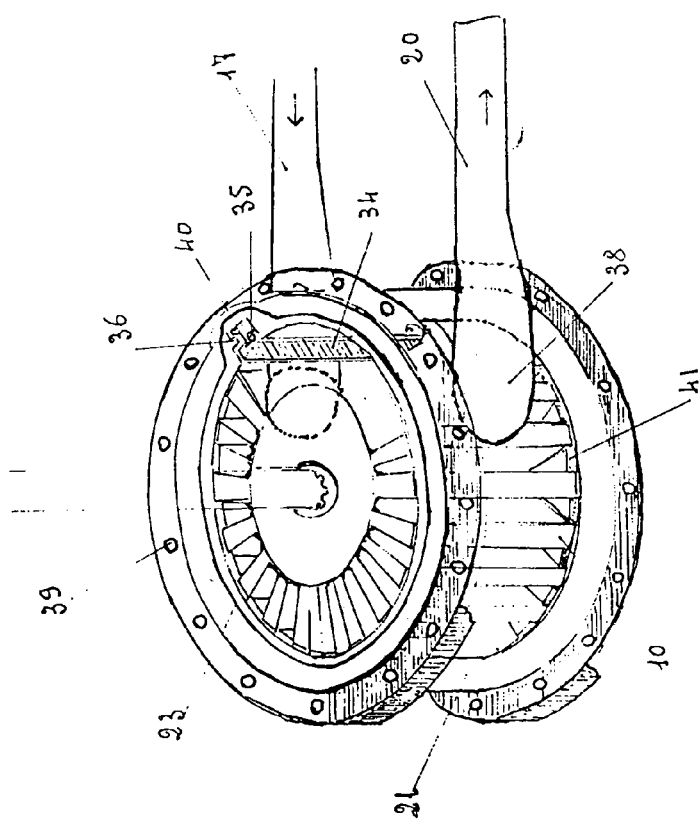

AIRCRAFT

BACKGROUND OF THE INVENTION

Field of the Invention

This invention relates generally to vehicle propulsion and, more particularly, to propulsion for an aircraft.

SUMMARY OF THE INVENTION

According to an aspect of the present invention, an apparatus comprises a hydraulic drive propelled by 2 composed separated forces including a relatively small engine, and a very high pressure pump driven by the engine, the pump being the force for operation of the different lifts and propulsions; a central chassis having tubes, the chassis defining a rectangular form for 3 persons including the pilot in the center above the engine, and 2 passengers on each side of the pilot for rapid exit, the chassis having a central axle, a first welded triangular girder fixed on the central axle, a second welded triangular girder fixed on the central axle, the second girder being behind the first girder, the first and second girders including strengthening crosspieces; first and second lift rotors; a first vertical shaft coupled to the first lift rotor; a first hydraulic turbine coupled to the first vertical shaft, the first hydraulic turbine being in fluid communication with the pump; a first support fixed at an end of the first girder, the first support holding the first hydraulic turbine; a second vertical shaft coupled to the second lift rotor; a second hydraulic turbine coupled to the second vertical shaft, the second hydraulic turbine being in fluid communication with the pump; and a second support fixed at an end of the second girder, the second support holding the second hydraulic turbine, wherein each lift rotor has 4 blades of variable pitch and triangular lift, each blade being more stable and wider at a pivoting connection, each blade having a tip with a downward 50 degree curve to avoid air gushing outwards, each blade having an air passage set at flat ejection housed at an end of the blade, to make a neutral space from the upper part of the lift of the blade, thereby avoiding vibration of the 4 blades of the lift rotor.

According to another aspect of the present invention, an apparatus comprises hydraulic drive means propelled by 2 composed separated forces including a relatively small engine, and a very high pressure pump driven by the engine, the pump being the force for operation of the different lifts and propulsions; a central chassis having tubes, the chassis defining a rectangular form for 3 persons including the pilot in the center above the engine, and 2 passengers on each side of the pilot for rapid exit, the chassis having a central axle, a first welded triangular girder fixed on the central axle, a second welded triangular girder fixed on the central axle, the second girder being behind the first girder, the first and second girders including strengthening crosspieces; first and second lift rotor means; first vertical shaft means coupled to the first lift rotor means; first hydraulic turbine means coupled to the first vertical shaft means, the first hydraulic turbine means being in fluid communication with the pump; a first support fixed at an end of the first girder, the first support holding the first hydraulic turbine means; second vertical shaft means coupled to the second lift rotor means; second hydraulic turbine means coupled to the second vertical shaft means, the second hydraulic turbine means being in fluid communication with the pump; and a second support fixed at an end of the second girder, the second support holding the second hydraulic turbine means, wherein each lift rotor means has 4 blades of variable pitch and triangular lift, each blade being more stable and wider at a pivoting connection, each blade having a tip with a downward 50 degree curve to avoid air gushing outwards, each blade having an air passage set at flat ejection housed at an end of the blade, to make a neutral space from the upper part of the lift of the blade, thereby avoiding vibration of the 4 blades of the lift rotor means.

BRIEF DESCRIPTION OF THE DRAWINGS

References are made to the following description taken in connection with the accompanying drawings, in which:

FIG. 5 is a view for describing a drive turbine.

The accompanying drawings, which constitute a part of this specification, illustrate embodiments of the invention.

DETAILED DESCRIPTION OF EXEMPLARY EMBODIMENTS

An example of the present original invention concerns a prototype of an apparatus using a new type of hydraulic turbine drive. The configuration for lift and propulsion of this apparatus is called ground and air Hydropal HP02.

Figure 1:
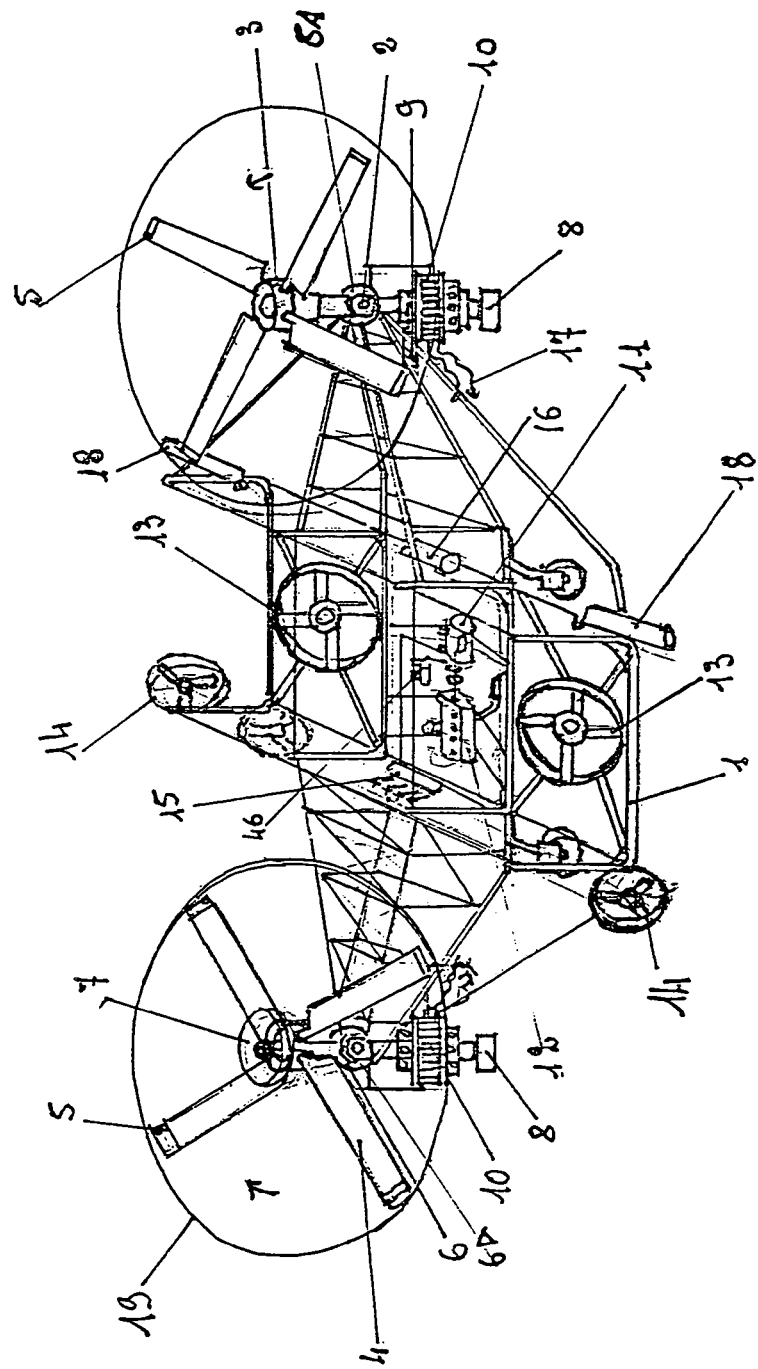
FIG. 1 is a view of an aspect of aircraft according an example of the present invention.
Figure 2:
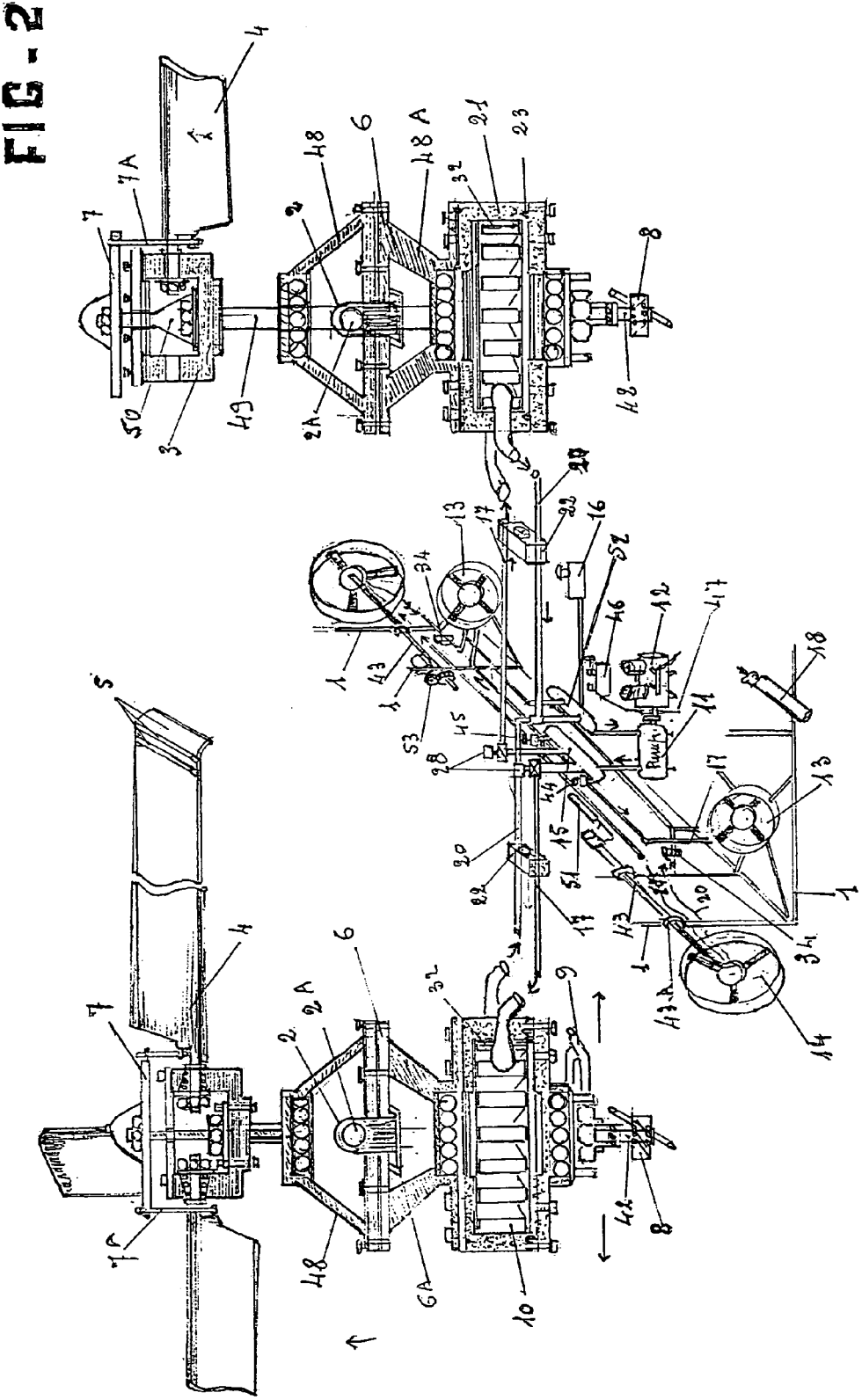
FIG. 2 is a view of an aspect of aircraft according an example of the present invention.

FIGS. 1 and 2 show a chassis (1) made of dural tubing or composite materials, assembled by welded struts with a rectangular cockpit at the center for the accommodation of three persons, the pilot being in the center. Two triangular girders are fixed at the center on the widest part of the chassis (1). Support (2) of the articulated rotors is fixed at the ends. Four wheels (two fixed, two articulated) for ground travelling are underneath the lower part of the chassis (1).

For lift are two main rotors (3), 2.70 meters in diameter with a multiplicity of four blades (4), triangular in shape, their lift being closer towards the connecting point, positioned on the rotor boss (3). Lift blades (4) with collective openings have their openings activated by the shaft (42) and the movement (8) linked to the collective pitch stick, placed and fixed to the floor near the pilot. The main rotor (3), principal support of the blade (4), is on the slide mobile shaft (42), which passes through the center of the main shaft (49) driving the main rotor (3). The connecting rods support plate (7) is held at the top of the shaft (42) connected to the fixing point situated on the blades (4). Blades (4) are collectively opened, activated by the plate (7).

Each of the main lift blades (4) has an anti-vibrating tip (5), placed 0.08 cm from the end of the blade. All the blades have a part with tube-air entry channeled, with air outflow action adjusted at a height of the stream of air shifted relative to the upper part of the airflow. According to this difference, the upper airflow of the blade (4) and the lower air outflow stream form a neutral part, preventing it from vibrating. The detachable blade (4) tips have a 50-degree down curve. Mounted, they allow air escape towards the outer circle of the blades (4) to be concentrated and halted.

The drive of the two main rotors (3) and other rotary elements, propellers (14) and turbine blades (13), is carried out by the pressure of a special very high pressure pump (11) driven by an engine running on fuel or by a small reactor.

The pump is driven by means of a clutch between the pump and the engine. This very high pressure pump (11) with built-in recycling sends its pressure to the manifold (15). This manifold (15) possesses various outlets, one leaving with its check valve (28) pre-set opening on progressive output rate, avoiding a violent admission to the turbine. This valve (28) is controlled by an electric contact emitted by the pilot, who possesses all the commands and controls on a panel placed at eye-level, fixed to the chassis (1) and in front of him.

The drive of the main rotors (3) is carried out by the pressure on standby in the manifold (15). The fluid travels through the piping (17) to the turbines (10), causing the turbines (10) to begin to turn in the designed direction. A non return flap (32) is placed on the inside of the body (21) of the turbine (10). The turbine beginning to rotate, the exhaust return (20) is operated by direct suction, meaning that no braking takes place on the cycle in circuit. The outlet valves (28) (44) (45), each with very slow opening, cannot damage the turbine (10) whose output is calculated for the number of revolutions scheduled on each turbine (10) placed on the rotating elements. The connection of the turbines to the piping (17) (20) is fixed to soft flexible tubing. Cooling fans are placed on the piping (17) (20).

The tilting of the main rotor heads (3) with their blades (4) is done from the cyclic pitch shaft fixed to the floor and placed near the pilot. The rotors (3) with lift blades are connected between each other to have the same tilting angle of degrees from front to back from point 0+6° and 0–6°. The two rotors (3) are fixed to their axle (2), which is fixed on part (6A), this axle being articulated by the thrust of the jack (9).

The two faired retractable propellers (14) (Patent FR 880092-0418218 PCT) are sustained by hydraulic turbine drive (10), which will have its diameter reduced and appropriate to its outer propeller (14) diameter by 0.60 meters and possess tri-blade propellers (14). The bodies of the turbines (10) in the body (21) are fixed on the upright supports, which are fixed to the shaft end (43) at 90°. The turbine (10) is fixed onto the support shaft (43) of the propellers (14). This assembly is mounted and fixed at the end of the shaft and slides along guides (43A). The shaft (43) slides when activated by a hydraulic jack (51) placed on each propeller (14) on each side. A manoeuvre is carried out according to requirements of the pilot. The support shaft (43) where the propellers (14) are fixed turns for a position required for circling, activated by a small reducer engine (52) placed on the shaft (43) and fixed to the chassis support (1).

What enables this manoeuvre is that the drive is effectuated by a hydraulic turbine (10) that is placed on the central drive shaft. A faired triple-blade propeller (14) is fixed upon the shaft. The rotation of direction enables the forward or backward movement of the flying machine by the propellers (14). This manoeuvre is possible given that the rotation force is situated on the propelling propeller shaft. This new hydraulic system enables these propellers (14), once out, to get into a swinging ascent position with a variant of 0°–180°. Moreover they are free of positioning and according to the movement to be carried out.

Feeds and returns (20) are connected by soft flexible tubing of the fixed pipes to the turbine (21). The flexible tubes slide along the shaft (43) held by a spring wire. These faired propellers (14) also contribute to moving the flying machine forward as a complement to the double rotors (3) with lift blades (4).

A double-action check valve (34) is placed on the return of the retractable propellers (14) to avoid the draining of the circuit in the case of non-use.

There is also an assembly of faired lift turbine blades (13) under the passenger seats and on each side. These blades (13) are of variable pitch and are connected to the rudder bar placed on the floor in the pilot's cabin for the opening of the pitch. These faired turbine blades (13) receive drive from turbine (10) (21), which is fixed on the drive shaft, holding the support boss of the blades (13). The support boss holds the pitch opening mechanism connected to the rudder bar. The fixing of the turbines (13) is done by the turbine support block (21), which is fixed by welding and tubes to the tubular chassis (1). This process of blades (13) enhances stability, additionally enabling stability to be reestablished, a few seconds after the commandos have jumped out through the action of the rudder bar on the blades (13), a manoeuvre either to the right or left.

The ailerons (18) placed externally behind the seats complete the piloting in horizontal flight. This flying machine is of lightweight design, as it possesses no mechanical transmission for heavy and unwieldy drives or reducers. All these drives are replaced by the principle of the hydraulic drive turbine, representing the force for the drive of the turbines, processes that are smoother and make no vibrations on the rotary points and are satisfactory.

The hydraulic power in the manifold reserve (15), with its very high pressure pump (11), takes up very little room.

The process according to FIG. 2, on the face of it is very simple in operation. This flying machine can be transported to the field of operation by trailer truck or by air.

An optional installation is disclosed for the event of stalling (very rare) of the main engine (12). A small air compressor (46) has been provided and it will always be under pressure with the reserve of air. It will have its system of automatic declutching, as soon as pressures are reached the process is as follows: the engine (12) having been declutched following a breakdown and through a simple manoeuvre engages the contact for opening the air valve to supply the air turbine situated on the pump shaft (11), this being in centrifugal motion. The force of the air turbine continues to make the lift rotors (3) rotate and enables the flying machine to land without damage.

Thus, according to an exemplary embodiment of the present invention, a hydraulic drive is propelled by two composed separated forces, from a relatively small engine and a very high pressure pump. The pump acts as force for operation of the different lifts and propulsions. A preferred apparatus includes a cockpit composed of dural or other tubes, rectangular in shape holding three persons including the pilot in the center above the mechanics. In the center on the central axle of the chassis are fixed, welded, triangular girders, one in front, one behind. These are equipped with strengthening crosspieces. At each end of the triangular girders, supports (2A) of each rotor are fixed to hold the rotor assembly, hydraulic turbines and vertical shaft (49). A rotor head is placed on each extremity. The preferred apparatus has two lift rotors equipped at each end with a shaft. Each rotor (3) is coupled to four blades (4) of variable pitch. These blades (4) are of triangular lift, being more stable, and wider towards the pivoting connection. At the end of the blades (4) are end of blade detachable wing tips with a downward 50° curve that avoids air gushing outwards. Four air passages set at flat ejection (5) are housed in the ends of the lift blades (4), making a neutral space of the upper part of the lift of the blade (4) and the jet (5) that avoids this vibration for the rotor blade assembly.

A non-return flap (32) is integrated in the turbine (10). The turbine (10) drives the shaft (49). The drive engine is suspended under blade support (4) rotor (3). The turbine (10) in its body is fixed to cones (48) and drives the shaft (49) surmounted by the rotor (3) with lift blades (4). The drive shaft (49) crosses the cones (48). Between the two the part (6) is situated where the male part (2A) is fixed the axles is fitted into the part (2) placed on the chassis, end of girder (1). This interlocking causes the whole of the lift rotor head (3) of the flying machine to articulate, the assembly tilting through the action of the jack (9) connected to the cyclic pitch stick located next to the pilot.

The opening of the collective pitch is operated by the shaft (42) crossing the central drive shaft (49) along its length to come out above the rotor boss (3) a cone (50) guides this shaft (42). The outlet of the shaft (42) at its end takes the support plate (7) with all the connecting rods (7A) connected to the blades (4) activated by the mechanism (8) connected to the collective pitch stick, which is located near the pilot, makes the opening of the collective pitch of both the two rotors (3) with anti-vibrating blades (5). The front and rear rotor heads, the latter being higher up in relation to the front rotor, are both connected together in order to have the same angle of inclination.

The whole assembly, hydraulic thrust and motorization are situated in the lowered center of the cockpit. The pilot is above where it is insulated and soundproofed, sitting in front of the instrument panel and electrical controls. The two passenger seats are on each side of the pilot and can be rapidly cleared. Motorization is carried out by internal combustion engine (12) or depending on the machine, a small jet driving a very high pressure recycling pump (11) by means of automatic clutch. This pump reverses onto a manifold (15) whose outlet valves are closed. This distributor manifold is always under pressure following connection to the pump outlet (11) to the manifold (15). The driving force (15) remains available, thus permitting movement around the machine with no danger, which is not the case with a helicopter.

For the deflation of the pressure in the circuits, open the valve (45) by electric contact, the blades (14) thus returning to their place located in front of the passengers, but insulated, the cockpit being airtight, thus maintaining safety.

The manifold is associated with valve outlets (28) (44) (45) that are pre-adjusted and progressive rate. An outlet (28) towards two rotors with lift blades (3) with adjusting screws on each outlet regulates the revolutions of the heads (3). An outlet with the valve (45) pre-adjusted output rate regulates two retractable faired propellers (14), twin-rate for the two propellers (14) as these operate in twos. An outlet with progressive and pre-set rate valve (44) is for stabilizing faired turbine blades (13). All these outlets have electric contact control. All the controls are placed on the instrument panel in front of the pilot; all the circuit returns are individual, are collected on a central manifold (52), which itself is connected onto the pump suction (11). A surge tank is placed behind the pilot's seat. A double action check valve (34) is placed on return (20) of this, in the case of voluntary non functioning.

For the retractable faired propellers (14), mechanical drive can be removed to be replaced by a hydraulic drive (10) and its body (21) whose drive turbine is placed at the end of the shaft, fixing the propelling propellers (14). The propellers (14), having their hydraulic motor at the end of the shaft, may be a retractable assembly. This process enables the propellers (14) once out of their internal housing to revolve from 0° to 180° on their axle support (43), which is placed on a guide (43A). With the thrust of the jack (51) a small reducing motor causes the shaft to turn (43) to position the propellers (14) in the revolving position estimated by the pilot.

The retractable propellers (14) are put out jointly or separately. The contacts are located on the joystick at the level of the pilot. The joystick is fixed to the floor on a ball and socket joint, which takes control of the flaps (18) and can be combined with the propellers (14). The faired propellers (14) are complementary if necessary, directing the machine towards the ground. The entirety of the circuits are cooled by means of an electric ventilation (22)

The flying machine shown in FIGS. 1 and 2 possesses two faired turbine blades (13) placed under the seats in the insulated floor. Seated people may exit rapidly. These faired turbine blades (13) have a multiplicity of blades fixed to the central support boss and are variable pitch. These mobile blades are connected from the pitch variation mechanism to the system on the rudder bar situated on the floor in front of the pilot, for the rotation of the turbine blades (13). This is done by turbine (10) and turbine body (21) is fixed to the chassis by welded tubes, the turbine (10) is appropriate in diameter according to the diameter of the lift blades not exceeding 0.60 meters. The supplies (17) (20) are carried out by flexible tubes connected to fixed tubes.

The faired, variable pitch turbine blades (13) lend stability in the case of the stability being off balance, either by the weight of the men on the one hand or, on the other hand, by a tendency of the aircraft to lean. Following the foot hitting the rudder bar, pushing on the side to be rectified, the aircraft rights itself horizontally in the line of flight. This case will tend to happen when the men jump to land on the ground, but everything stabilizes in a few seconds.

In the entirety of its design will be a lightweight construction, made lighter by removal of box mechanics, and heavy and awkward universal joints. It will involve little maintenance, will be simple to pilot, and have a velocity of approximately 100 km an hour.

The hydraulic drive system and processes may be installed as replacement of mechanical movements which will be a weight gain thus carrying men or equipment. The valves of the outlets are closed and ready to lift off in the seconds following by the reserve (15) engine on stand by, therefore security for the persons around. This system may be installed on current models of helicopters.

A security system can be mounted if necessary. Thus, in case of drive motor break down, a safety and emergency system is installed on the machine (Hydropal air). The drive connection is carried out by an automatic clutch (47) whose drive air turbine is on its shaft on the hydraulic pump side. This turbine is linked to the air reserve by pipes with the compressor (46). In the case of the engine stopping (12), the pilot engages the air turbine, which runs the hydraulic pump and enables the machine to land.

This replacement hydraulic system removes the transmission box set, universal joints and other mechanical drives. Moreover the reactor will be of lesser power, and lesser weight, which can lead to several hundreds of kilograms. The anti-torque rear rotor (24) is also driven by hydraulic turbine with the same installation on the support axles.

Figure 3:
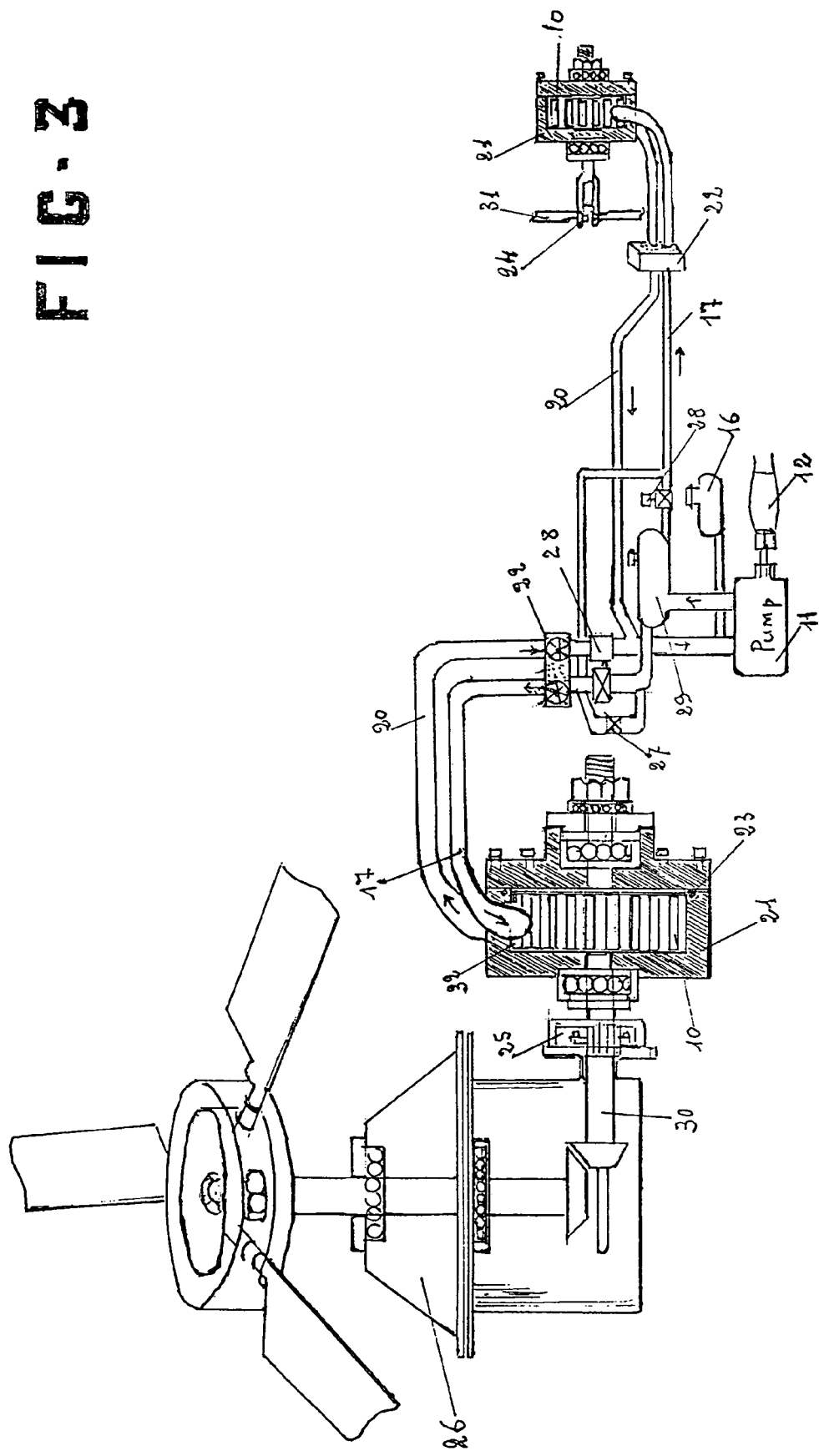
FIG. 3 is a view of a configuration installed on helicopter as replacement for universal joint box system.
Figure 4:
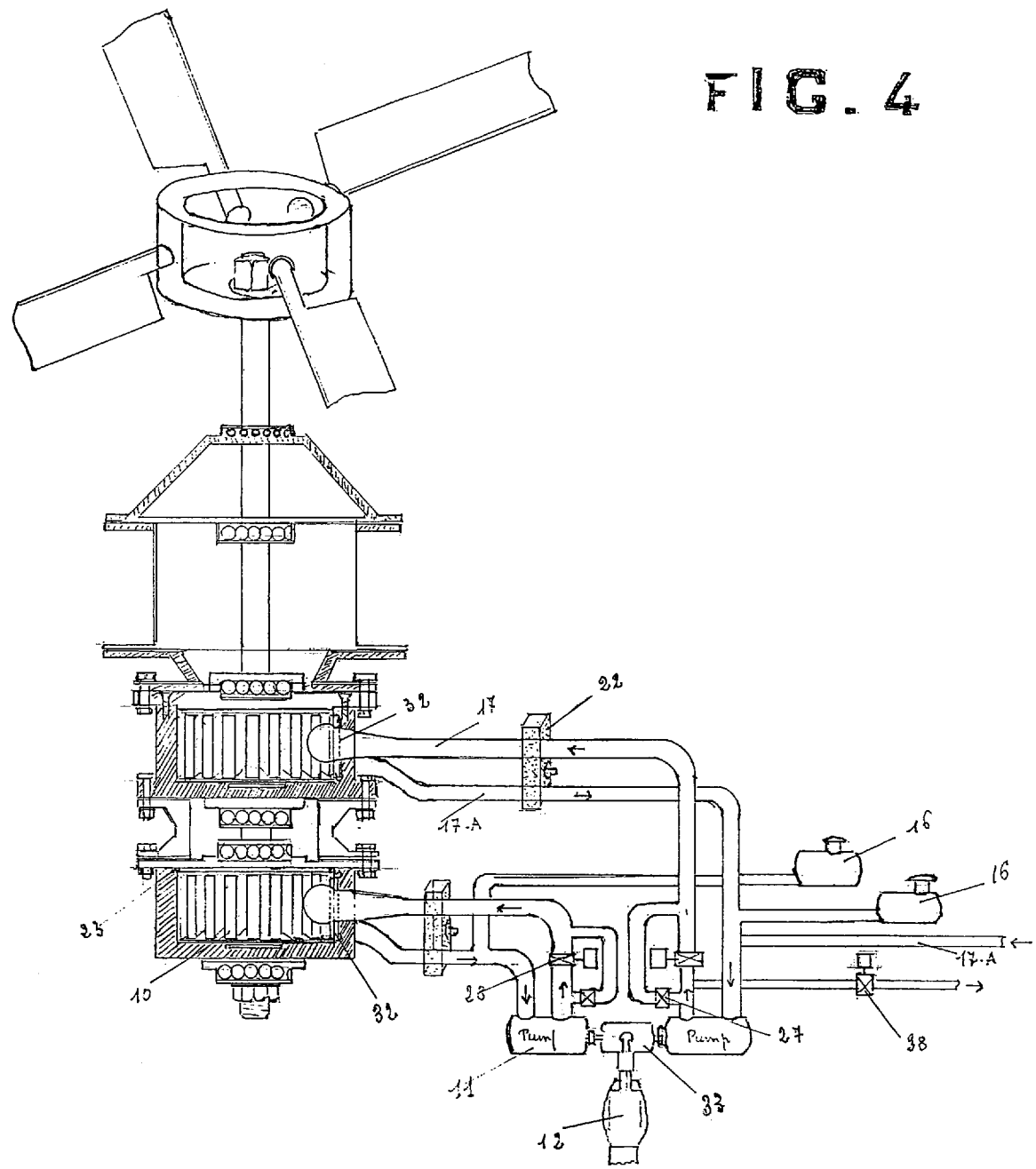
FIG. 4 is a view of an assembly.

As shown in FIGS. 3 and 4, the principle of hydraulic drive, can be mounted onto rotating wings of a certain present and future type. As shown in FIG. 3, an exemplary configuration can be installed on a helicopter as replacement for universal joint box system. This exemplary configuration includes, oil cooling radiator—22, anti-torque rear rotor assembly 24, automatic clutch 25, present main rotor assembly 26, manual by-pass valve 27, preset opening valve with progressive fluid passage 28, main fluid distribution tank leaving from the pump outlet 29, transmission shaft 30, and rear rotor blades 31.

FIG. 4 shows an exemplary assembly including anti-return flap 32 incorporated in the body of the turbine's fixed pump, liquid tank 16, pressure supply of the Very High Pressure Pump 17, return 17A of anti-torque rear rotor FIG. 3, airtight joint of the cover 23, engine 12 operating on fuel or small reactor, and drive distributor 33 of the 2 pumps.

This technique of a new design of hydraulic drive has been satisfactory in trials. This lower cost process has a future with this hydraulic propulsion, for certain types of flying machines now and in the future. This hydraulic process can be installed on wheeled and rail vehicles. This design allows economizing consumption while being less polluting and less noisy. This process can also be mounted onto future electric vehicles. The hydraulic drive for these vehicles can be made using a small conventional engine for a similar speed. The principle of the hydraulic drive turbine can be adapted to the drive axle to propel a boat, a train, a ground wheeled vehicle or other vehicles of this type.

Descriptive List for FIGS. 1 and 2

1 Tubular Chassis
2 Central hinge pins controlling the rotor head
3 Blade support boss
4 (4) blades with more central pitch
5 Anti-vibrating system for blade ends
6 Support plate with articulated head
7 Sliding plate with small connecting rods for pitch opening
8 Opening system for the assembly of the collective pitch connected to the inside lever
9 Cyclic pitch jack of the rotor
10 Hydraulic drive turbine of the rotors
11 Very High Pressure Pump, supplying power to the rotor by integrated recycling
12 Drive engine of the Very High Pressure pump
13 Faired turbine blades with adjustable pitch with hydraulic drive for the flying machine's stability, connected to the rudder bar
14 Retractable propellers rotating from 0° to 180°
15 Manifold feeding the different turbines with preset valves for progressive output rate
16 Expansion tank with filling cap
17 Rigid piping, flexible tubing for feed and return situated on each outlet and return of the 6 turbines
18 Stabilizing and directional ailerons of the flying machine
19 Protection bands
20 Return pipe
21 Very High Pressure turbine body
22 Cooling radiator
23 Turbine body airtight joint Descriptive List for FIG. 4

32 Anti-return flap incorporated in the body of the turbine's fixed pump
16 Liquid tank
17 Pressure supply of the Very High Pressure Pump
17A Return of anti-torque rear rotor FIG. 3
23 Airtight joint of the cover
12 Engine operating on fuel or small reactor
33 Drive distributor of the 2 pumps Descriptive List for FIG. 5

32 Anti-return flap housed in the thickness of the side including spring incorporated in pivoting pin
34 Check valve with return thrust opening
35 Flap axis
36 Flap check
37 Turbine body
38 Exhaust outlet with wide emission
39 Holes for attaching the cover to the body of the turbine
40 Non-return return spring of the flap
15, 41 Upper and lower flanges blocking any pressure on the fins
42 Opening shaft of the collective pitch
43 Slidable support shaft where the propellers (14) are fixed
44 Progressive opening valve with electric contact for the turbine blades (13)
45 Propeller supply valve (14)
46 Compressor Descriptive List for FIG. 2

43 Propeller central shaft 14
44 Preset valve
45 Outlet valve
46 Air compressor
47 Air turbine
48 Conical supports for the rotor head
49 Main shaft running through the assembly
50 Collective pitch opening guide support
51 Propeller outlet jack (14)
52 Fluid return vessel
53 Reducer engine causing the propellers to rotate (14) on their axles (43)

Descriptive List for FIG. 3

22 Oil cooling radiator
24 Anti-torque rear rotor assembly
25 Automatic clutch
26 Present main rotor assembly
27 Manual by-pass valve
28 Preset opening valve with progressive fluid passage
29 Main fluid distribution tank leaving from the pump outlet
30 Transmission shaft
31 Rear rotor blades The invention is defined in the following claims.

The invention claimed is:

1. An aircraft comprising:
a hydraulic drive propelled by 2 composed separated forces including an engine, and a very high pressure pump driven by the engine,
a central chassis having tubes, the chassis defining a rectangular form for 3 persons including the pilot in the center, above the engine, and 2 passengers on each side of the pilot for rapid exit, the chassis having a central axle, a first welded triangular girder fixed on the central axle, a second welded triangular girder fixed on the central axle, the second girder being behind the first girder, the first and second girders including strengthening crosspieces;

first and second lift rotors;
a first vertical shaft coupled to drive the first lift rotor;
a first hydraulic turbine coupled to drive the first vertical shaft, the first hydraulic turbine being in fluid communication with the pump;
a first support fixed at an end of the first girder, the first support holding the first hydraulic turbine;
a second vertical shaft coupled to drive the second lift rotor;
a second hydraulic turbine coupled to drive the second vertical shaft, the second hydraulic turbine being in fluid communication with the pump;
a second support fixed at an end of the second girder, the second support holding the second hydraulic turbine, wherein each lift rotor has 4 blades of 20 feet diameter, each blade being more stable and wider at a pivoting connection, each blade having a tip downward 50 degrees curve to avoid gushing outwards, each blade having an air passage, thereby avoiding vibration of the 4 blades of the lift rotor;
a source of compressed air, and a mechanism that couples the source of compressed air to the very high pressure pump in the event of failure of the engine.

2. An aircraft in accordance with claim 1 further including a body with a non-return flap integrated in the first hydraulic turbine.

3. An aircraft in accordance with claim 1 wherein the first lift rotor is configured to articulate in response to the action of a control stick.

4. An aircraft in accordance with claim 3 further including a cone for guiding the vertical shaft.

5. An aircraft in accordance with claim 1 further including a pressure manifold;
a first valve coupled to the pressure manifold; and
a second valve coupled to the pressure manifold, in parallel with the first valve, wherein the first hydraulic turbine is in fluid communication with the pump via the pressure manifold and the first valve to regulate revolutions of the first turbine, and the second hydraulic turbine is in fluid communication with the pump via the pressure manifold and the second valve to regulate revolutions of the second turbine.

6. An aircraft in accordance with claim 1 further including a retractable faired propeller for very precise movement of the aircraft is hovering; and
a manifold with an outlet, having a pre-adjusted output rate, in communication with the pump and the retractable faired propeller.

7. An aircraft in accordance with claim 6 wherein the retractable faired propeller is configured to rotate 180 degrees thus enabling forward or backward movement of the aircraft.

8. An aircraft in accordance with claim 6 further including a second retractable faired propeller that can be moved jointly or separately relative to the first retractable faired propeller.

9. An aircraft in accordance with claim 1 further including a pressure manifold wherein the first hydraulic turbine is in fluid communication with the pump via the pressure manifold.

10. An aircraft in accordance with claim 1 further including a clutch between the engine and the hydraulic pump.

* * * * *